May 20, 1924.　　　　　　　　　　　　　　　1,494,824
J. H. TAYLOR
PROCESS OF WELDING PIPE PADS TO PIPES AND TANKS AND BLANK THEREFOR
Filed Sept. 8, 1923
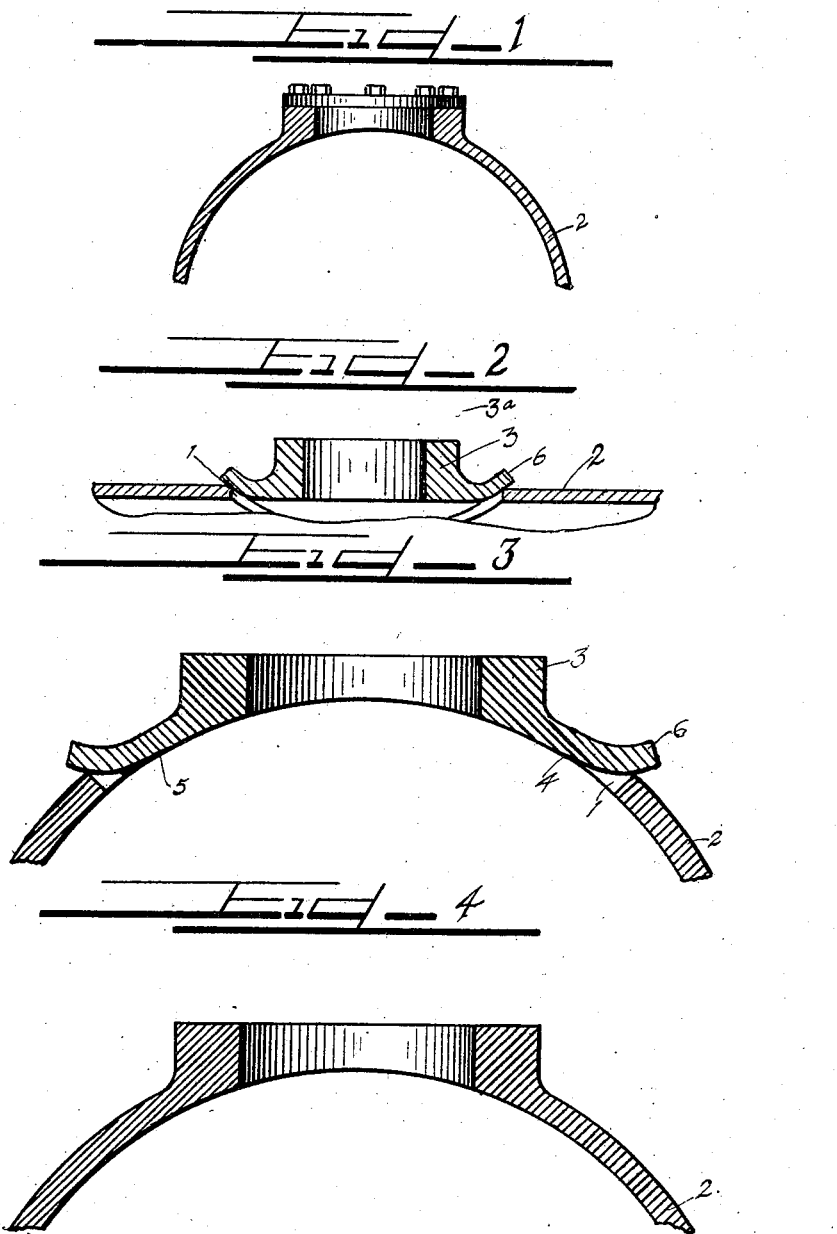

Patented May 20, 1924.

1,494,824

UNITED STATES PATENT OFFICE.

JAMES HALL TAYLOR, OF CHICAGO, ILLINOIS.

PROCESS OF WELDING PIPE PADS TO PIPES AND TANKS AND BLANK THEREFOR.

Application filed September 8, 1923. Serial No. 661,716.

*To all whom it may concern:*

Be it known that I, JAMES HALL TAYLOR, a citizen of the United States, and a resident of the city of Chicago, in the county of Cook and State of Illinois, have invented certain new and useful Improvements in a Process of Welding Pipe Pads to Pipes and Tanks and Blank Therefor; and I do hereby declare that the following is a full, clear, and exact description of the same, reference being had to the accompanying drawings, and to the numerals of reference marked thereon, which form a part of this specification.

This invention relates to an apertured structure commonly called a pipe pad, and the method of incorporating the same in a pipe, vessel or the like.

In the manufacture of large pipes, it is not expedient to form the same with proper outlet apertures. It is customary to shear a circular disk from the pipe section when such aperture is desired and insert an apertured structure known as a pipe pad in the sheared opening. Various ways have been devised for inserting and securing the pipe pad, but they all involve a tedious and difficult process and the results attained have been more or less unsatisfactory.

It is therefore an object of this invention to provide a novel method of incorporating an apertured structure such as a pipe pad in a pipe or tank, which is simpler and more quickly performed than those hitherto in use, and which produces a strong and inseparable union between the pipe and the manhole structure.

The invention comprises the novel method and structure hereinafter described and more particularly pointed out and defined in the appended claims.

In the accompanying drawings which illustrate a preferred embodiment of this invention and in which similar reference numerals refer to similar features in the different views:

Figure 1 is a transverse sectional view through a large pipe having my apertured structure incorporated therein.

Figure 2 is a sectional view of the pipe and apertured structure illustrating one step in the method of incorporating the same.

Figure 3 is an enlarged fragmentary sectional view of the pipe and apertured structure similar to Figure 2, illustrating how the latter may simply rest upon the margin of the aperture.

Figure 4 is an enlarged fragmentary sectional view of the pipe and apertured structure illustrating the union therebetween.

In referring to the drawing, it will be observed that this novel process of incorporating an apertured structure in a pipe or hollow cylindrical member consists in shearing or forming an appropriate aperture 1 in the pipe 2 which aperture may be of any desired design; it is, however, preferably circular. I then form an apertured structure or pipe pad 3 or $3^a$ of suitable design having an interior arc between the points 4 and 5 corresponding to the arcuate interior surface of the cylindrical member 1, and having an outwardly sloping uniform margin 6 which overlaps the edge of the sheared opening 2 so that the apertured structure may be readily seated in or over said sheared aperture and supported by the margin of the opening. I then weld the outwardly sloping margin of the apertured structure upon the upper margin of the sheared opening in the pipe producing an upward arcuate flow of the margin of the opening in the pipe and a downward arcuate flow of the sloping margin of the apertured disk and bringing the interior and outer surfaces of said apertured structure flush with the interior and outer surfaces of the cylindrical member 1 as shown in Figure 3. The method hence involves a reduction and elongation of the margins of the aperture and the inserted structure.

From the foregoing, it will be apparent that the novel method described does not require the apertured structure to be fitted in the sheared aperture. It hence does not require accurate milling. Further, it avoids the difficult task of alining and securing a structure that fits in the sheared aperture. The novel process merely requires that the apertured structure be properly seated and centered before the welding operation begins. Further, the reduction and elongation of the welded margins forms a more perfect and homogeneous union without weakening the strength of the pipe.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The process of incorporating an apertured structure in a hollow cylindrical member consisting of shearing or producing an aperture in said member of less size than said structure, positioning said structure with its marginal edge resting upon and overlapping the margin of said aperture, then welding said margins in overlapping relation, and reducing to the approximate thickness of said member.

2. The process of incorporating an insert in a hollow cylindrical member which consists in forming an aperture in said member of less size than said insert, positioning said insert with its marginal edge resting upon and overlapping the marginal edge of said aperture, reducing, elongating and joining said margins by welding.

3. An apertured insert for a pipe comprising a member having an interior arcuate portion corresponding to the interior arcuate surface of said pipe and an outwardly sloping and slightly upturned margin, and adapted for welding to the exterior of the pipe.

4. The combination with a cylindrical member having an aperture, of an apertured insert therefor larger than said aperture, and means for uniting the margins of said aperture and insert in overlapping relation and reducing the same to approximately the thickness of said member by welding.

In testimony whereof I have hereunto subscribed my name in the presence of two subscribing witnesses.

JAMES HALL TAYLOR.

Witnesses:
 CARLTON HILL,
 OSCAR HARTMANN.